United States Patent [19]

Schulz

[11] 4,050,543
[45] Sept. 27, 1977

[54] LUBRICATING DEVICE FOR GEARS

[75] Inventor: Wolfgang Schulz, Munich, Germany

[73] Assignee: Carl Hurth Maschinen- und Zahnradfabrik, Munich, Germany

[21] Appl. No.: 691,015

[22] Filed: May 28, 1976

[30] Foreign Application Priority Data

July 11, 1975 Germany .............................. 2531029

[51] Int. Cl.² .............................................. F01M 9/00
[52] U.S. Cl. ..................................................... 184/6.3
[58] Field of Search ................... 184/6.3, 6,12, 67, 74, 184/83; 123/196 S

[56] References Cited

U.S. PATENT DOCUMENTS

| 1,105,126 | 7/1914 | Doyle | 184/83 |
| 2,033,992 | 3/1936 | Moller | 184/6.3 |

Primary Examiner—Samuel Feinberg
Attorney, Agent, or Firm—Blanchard, Flynn, Thiel, Boutell & Tanis

[57] ABSTRACT

A lubricating device for dispensing a prescribed amount of lubricant onto gearing at intervals during the operation or immediately upon starting the gears. The lubricating device is composed of a tank having a bell-like housing located therein. The lower edge of the bell is spaced upwardly from the bottom wall of the tank to permit lubricant to flow inside the bell. A valve member is cooperable with the bottom wall of the tank, which bottom wall has openings therein, and is operatively connected to the bell. The valve is opened simultaneous with a closing of the gap between the lower edge of the bell and the upper surface of the bottom wall so that the lubricant within the bell is dispensed out through the discharge openings in the bottom wall of the tank.

3 Claims, 1 Drawing Figure

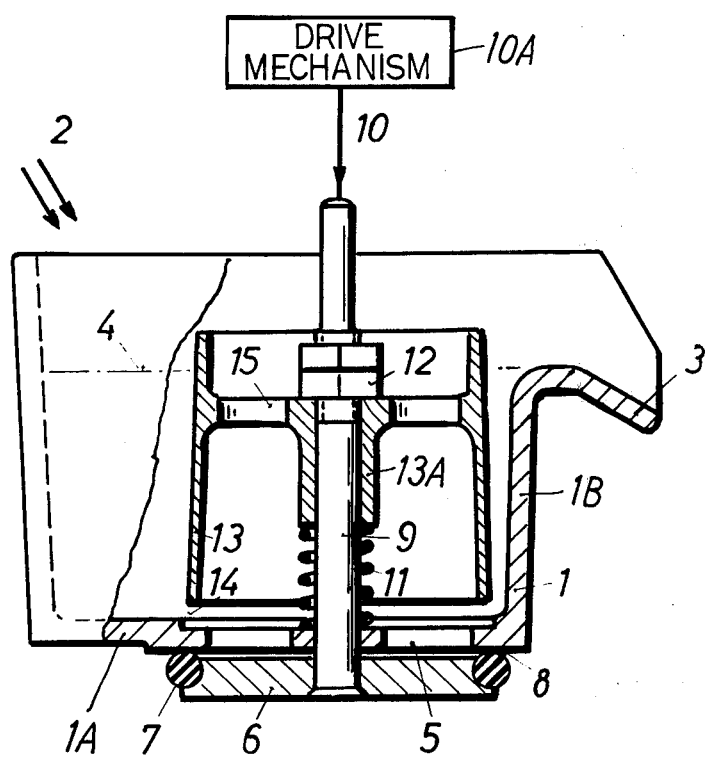

LUBRICATING DEVICE FOR GEARS

FIELD OF THE INVENTION

The invention relates to a lubricating device and, more particularly, to a lubricating device for dispensing a prescribed amount of lubricant during each operation thereof.

BACKGROUND OF THE INVENTION

Spur or bevel gearings or the like are often lubricated by plunging one or some gear elements into a lubricant sump and spraying around of the lubricant. In order to guide the oil to special places of use, special lines are provided which are often fed by storage tanks, which are filled with spraying oil or by means of wiping-off devices. It is also known to supply the lubricating places from a storage tank with an oil pump.

To start a gear unit is critical, because, on the one hand, the teeth mating in the starting condition may be dry, on the other hand, however, the gears have not yet carried out a sufficient angle of rotation for a splash or plunge libration to have occurred. the conventional storage tanks, which are filled by spraying oil or through wipers during the operation, cannot supply the teeth with lubricant during the starting condition, because they run idle during the run or shortly after standstill of the gear unit. Oil pumps are not as yet effective in the starting condition. One can already switch on the oil pumps during the start of the gear unit. This, however, is not possible during a pure plunge lubrication because there is no pump provided. On the other hand, this measure requires one more operation for the start, which increases the error possibility.

The basic purpose of the invention is to construct the lubricating device simply and thus inexpensively.

The invention will be discussed with relation to the exemplary embodiment illustrated in the drawing.

DETAILED DESCRIPTION

A storage tank is identified with reference numeral 1 and has a bottom wall 1A and an upstanding sidewall 1B. The tank 1 is filled with lubricant during the operation of a gear unit. The feed of lubricant to the tank 1 is schematically indicated by the arrows 2. The storage tank 1 has a spout 3 or the like adjacent the upper edge of the wall 1B through which lubricant runs out during the operation. The highest level 4 for the lubricant is determined by the height of the spout above the bottom wall 1A in the storage tank.

The bottom wall 1A of the storage tank has one or several discharge openings 5 therein which are closed during operation by a valve plate 6. The valve plate 6 has, for this purpose, an annular rubber seal 7 or the like which is pressed against a seat 8 on the bottom wall 1A by the valve plate 6. The valve plate 6 is secured to the lower end of a spindle 9 which extends through the storage tank 1. The spindle 9 is guided in a bore which exists in the bottom wall 1A of the storage tank and, advantageously, by a further upwardly located and not illustrated guideway. The opening force, schematically illustrated by the arrow 10, is applied to the upper end of the spindle 9. This opening force is caused by a drive mecahanism 10A, such as an electromagnet which is switched on for a short time during or prior to the start of the gear unit. The closing force (pressure of the rubber seal against the seat) is caused by a spring 11 which is, at one end, supported on the bottom wall 1A of the storage tank 1 and, at the other end, presses against a nut 12 and lock nut which are secured to the spindle.

The hub 13A of a bell 13 is positioned on the spindle 9 between the other end of the spring and the nut 12. The bell 13 encircles the hub 13A and the discharge openings 5 in such a manner that when the valve plate 6 is closed, an annular gap 14 is provided between the bottom of the bell 13 and the upper surface of the bottom wall 1A. The bell has a sufficient height that its upper edge, even if the bell is lowered, does not extend below the lubricant level 4. Thus, the inside of the bell 13 is filled with lubricant through the gap 14. Openings 15 in the web connecting the hub 13A to the bell 13 assure the proper ventilation of the bell during filling and emptying of the tank 1.

The gap 14 and the opening height of the valve 6 can be adjusted by the threads on the nut 12.

The storage tank 1 is filled during the operation; it takes a multiple of the volume of the bell, at the same time the bell 13 is also being filled. Prior to or during the start of the gear unit, when the gears are still dry, the spindle is operated by the electromagnet or the like. The valve plate 6 is pressed downwardly and the discharge openings 5 are opened. At the same time the gap 14 is closed so that only a prescribed amount of lubricant limited by the amount in the bell can flow through the discharge openings. Thus it is possible to wet the still dry gear unit several times during one start or during several quickly successive starts each with lubricant from the storage tank.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A lubricating device for gears and the like in starting condition comprising a lubricant storage tank, which is filled during operation and emptied prior to or during the starting of the gear unit, with an automatic emptying device by means of a valve, in pregiven amounts wetting at least one of the gears to be lubricated, comprising the improvement wherein a storage tank which is open toward the lubricating place is closed off by the valve which can be opened during the starting condition, which valve is combined with a bell, ring or the like, which holds the one-time lubricating amount, the lower edge of which bell, ring or the like is spaced from the bottom of the tank when the valve is closed to define a gap which surrounds the discharge openings adjacent the bottom of the storage tank, which gap is closed during opening of the valve.

2. A device according to claim 1, wherein the valve can be operated with an axial spindle which extends through the storage tank, on which spindle the bell, ring or the like is secured.

3. A device according to claim 1, wherein the gap is adjustable.

* * * * *